UNITED STATES PATENT OFFICE.

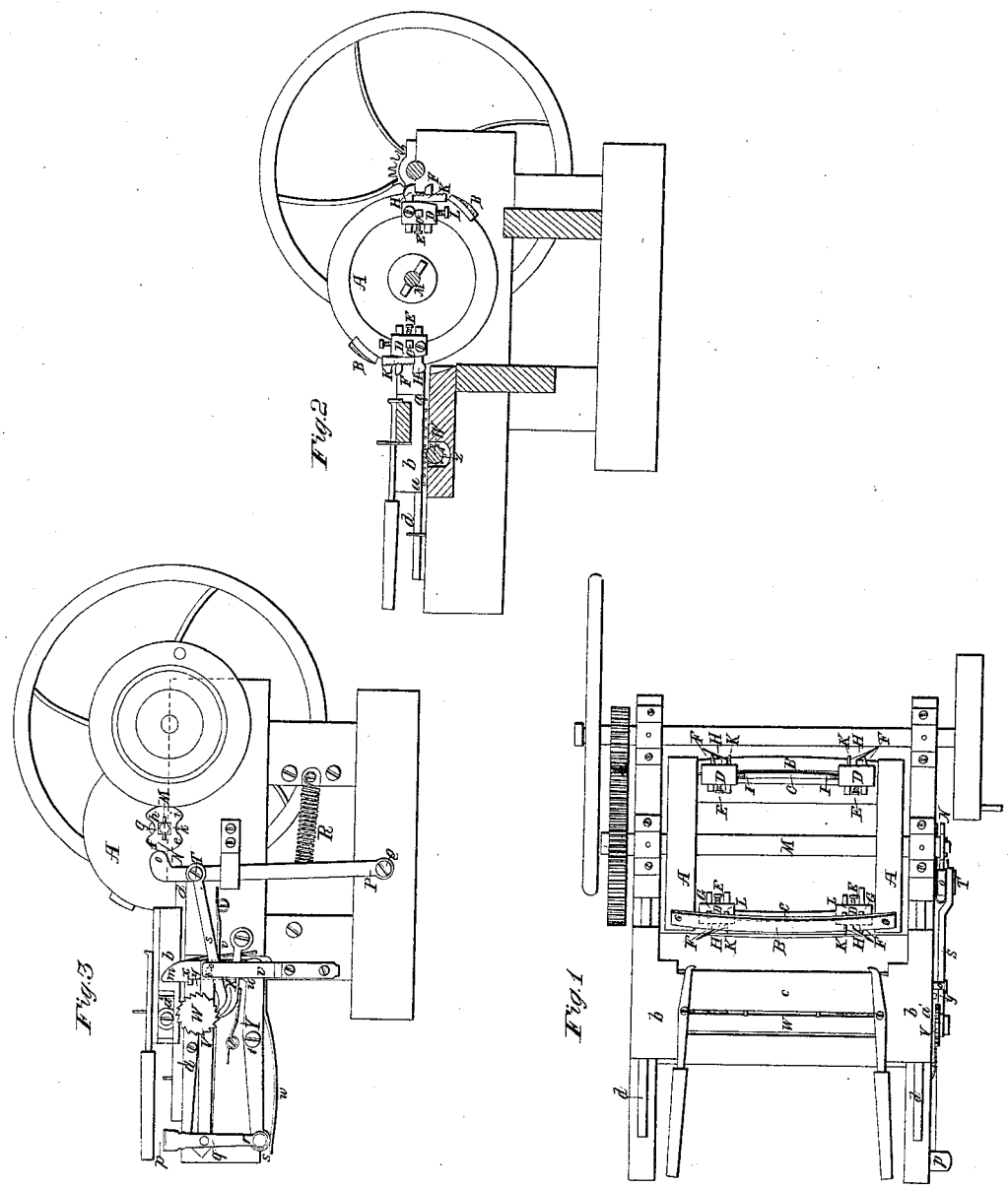
C. Manning,
Making Staves.
Nº 2,038.   Patented Apr. 10, 1841.

CEPHAS MANNING, OF ACTON, MASSACHUSETTS.

MACHINE FOR CUTTING STAVES.

Specification of Letters Patent No. 2,038, dated April 10, 1841.

*To all whom it may concern:*

Be it known that I, CEPHAS MANNING, of Acton, in the county of Middlesex and State of Massachusetts, have invented new and useful Improvements in Machinery for Cutting Staves.

The said improvements the principles thereof and manner in which I have contemplated the application of the same by which they may be distinguished from other inventions of a like character together with such parts or combinations I claim to be my invention and for which I solicit Letters Patent, I have herein set forth in the following description and accompanying drawings which taken in connection form my specification.

Figure 1 represents a top view of my machinery. Fig. 2 is a transverse section and Fig. 3 a side elevation.

The first of my improvements is to be used in connection with the machinery which separates the stave from the block of wood, from which said stave is formed and which is represented and described in two patents heretofore granted to me on or about the tenth and fourteenth days of September in the year of our Lord eighteen hundred and forty.

The object of my first improvement is to cut the stave to the required length, to form the chamfer or bevel of the inside of that part of each end of the stave which projects beyond the head when set up in the barrel, and also to cut the grooves on the inner face and near each end, wherein the circumference of the head is inserted so that in connection with the other machinery, or that which separates the stave from the block to complete said stave in every respect, with the exception of dressing the side edges.

Extending between the arms or two heads A A of a revolving shaft M Figs. 1, 2, 3, to which the knives B, B, of a stave cutting machine are attached, are two square or other proper shaped bars C C, the same being suitably secured at their ends to each head, at a suitable distance from the circumference of the heads or circle of revolution of the knives as seen in the drawings. Two square or other proper shaped blocks of metal or holders D D are placed on each bar C, the bar passing through suitable mortises cut in each block, and which are so arranged that the block can be moved laterally on the bar and confined in any position therein by a set screw E screwed into the rear of the block, and abutting against the side of the bar C. A knife or cutter F is inserted in a mortise formed through each block from front to rear, and is therein confined by a set screw G as represented in the drawings. The knives F are for the purpose of cutting off the stave to the proper length, and this they do, by entering into the block a distance equal to the thickness of the stave to be separated.

H H are other knives, properly formed and standing diagonally and suitably situated, so as to bevel each end of the inner side of the stave. These knives are supported in the blocks and confined by set screws I I similar to the knives F F. Other knives cutters or saws K K are also suitably placed and similarly affixed and confined by set screws L L in the blocks, these latter being for the purpose of cutting the grooves in each end of the inner side of the stave. The set screws above mentioned as belonging to the cutters enable us to place the cutters in their proper positions to perform their required duties. It will be seen by inspection of the drawings, that all these knives or cutters, as they are revolved by the shaft on which the heads A A are fixed perform their operation on the stave befor it is separated from the block, and before the knives B B enter the same. They are then immediately followed by the knives B B (which should be placed at a suitable distance in rear of the above), which cut or separate the stave from the block. The said cutters for forming the grooves bevels, and cutting off the ends of the staves may also be applied in a similar manner to hand machines or those where the knives which separate the stave from the block are attached to levers or radial arms and move or vibrate only in a sector of a circle, instead of revolving through an entire circle as above described.

The second of my improvements consists in the arrangement of the machinery which operates the carriage which holds the block, and is thus described. On one end of the revolving shaft M to which the cutters are connected I affix a double cam N, Figs. 1, and 3, against which the bent end O of an upright bar O P bears, the said bar vibrating and being supported on a bolt or screw Q at its foot P and being drawn or pressed against the periphery of the cam N, by a wound or other suitable spring R, Fig. 3. A pawl S is joined at one end to the upright bar O P, and at a point thereof, at a short distance below the top O, by a pin or screw bolt T passing through each and confined in the bar O P. The end of the pawl S supported by the pin T is fitted loosely thereon, so as to permit the opposite or sharp end of the pawl to play up and down and to otherwise perform its operations. A spring U presses the curved end of the pawl S against the teeth of a ratchet wheel V situated on one end of the shaft W, which moves the carriage for holding the block of wood. Another or holding pawl X is placed immediately underneath the pawl S and its end is pressed up or against the teeth of the ratchet wheel V by a spring Y properly applied thereto. The shaft W has a cogged pinion Z placed thereon, near each end, the said pinions playing into toothed racks $a$ $a$, applied to the underside of each side $h$ of the carriage $b$ $c$ $b$. The carriage $b$ $c$ $b$ is supported, guided by and moves on rails $d$ $d$ Figs. 1, and 3 or in any other suitable manner.

From the above it will be seen, that while the cutters are performing their operations on the blocks of wood, that it should remain perfectly at rest, and that the part of the cam N, or $e$ $f$ or $g$ $h$ in contact with the end of the bar O P should be the arc of a circle. As soon as the stave is separated from the block by the knife which cuts it therefrom, the carriage should be pressed forward a distance equal to the thickness of the next stave to be formed. The parts $f$ $g$ $h$ $i$ $k$ $e$ of the cam N are reentering so that as the shaft M revolves, the spring U draws the curved or bent end O of the lever O P, back or over the parts $i$ $k$ or $f$ $g$ until it reaches the parts $k$ or $g$ of the cam, thus giving to the pall S a retrograde movement. Then as the cam revolves further the portions $e$ $k$ $g$ $h$ of its periphery press forward the bar O P and pawl S, whose end acting on the teeth of the ratchet wheel V turns the same around a sufficient distance, to advance the carriage, in order that the next succeeding set of cutters, may separate a stave from the block held by the same.

In order to throw the pawls S and X out of gear with the ratchet wheel V at any time whenever desirable the machinery is further arranged in the following manner: A lever $s$ $t$ $u$ is jointed at one end $s$ to the lower end $r$ of an upright hand bar $p$ $q$ $r$. It also plays on a fulcrum, screw or pin inserted in the frame at $t$ and is connected or jointed at its end $u$ to an upright catch $v$ $l$ $m$. A bar $l$ $q$ is jointed at one end to the catch $v$ $l$ $m$, just above the pawls S and is also properly jointed at its other end to the upright hand bar $p$ $q$ $r$ at or near the middle of the same as seen in Fig. 3. The catch $v$ $l$ $m$ has a pin $o$, Figs. 1 and 3, projecting from its side and resting on the upper surface of the pawl S. The end $s$ of the lever $s$ $t$ $u$ is pressed upward by a suitable spring $w$ acting against the underside of the same. The upper part of the catch $v$ $l$ $m$ is formed with a notch or projection on one side as seen at $x$, which when the catch is raised up and down forward so as to throw the palls S X into gear with the ratchet V, rests upon a projecting pin $y$ driven into the side of the frame. Therefore by applying force against the side of the top $p$ of the upright bar $p$ $q$ $r$ to press the same forward in a direction toward the cam N, the upper part of the catch $v$ $l$ $m$ will also be moved in that direction, and the instant the projection or notch $x$ passes by the pin $y$, the force of the spring $w$ acting on the lever $s$ $t$ $u$ raises the end $s$ at the same time depressing the end $u$—and carries down the catch $v$ $l$ $m$, whose projecting pin $o$ in contact with the upper surface of the pawl S presses the same down and throws it and the lower pawl X out of gear with the ratchet. This being effected the revolution of the cam N does not cause the pawl as it moves to and fro to turn the ratchet wheel V, and therefore the carriage $b$ $c$ $b$ remains stationary. As the lower side of the pawl S near the bent end of the same is in close contact or very nearly so with the upper side of the lower pawl X, the depression of the upper pawl S by the projecting pin $o$ will also lower the pawl X away from the teeth of the ratchet wheel.

Now in order to throw the pawls into gear with the ratchet wheel V, we press down the bar $p$ $q$ $r$, by applying the hand to its top $p$, until we raise the projection or notch X of the catch $v$ $l$ $m$ to the level of the top of the pin $y$; then drawing the top $p$ of the bar $p$ $q$ $r$ back, we at the same time draw back the catch $v$ $l$ $m$ the force being exerted through the bar $l$ $q$ and the notch $x$ rests upon the pin $y$. The springs U Y raise the pawls to the teeth of the ratchet wheel.

In order to stop the forward movement of the carriage $b$ $c$ $b$, when the block of wood held by the same is cut up into staves a projection $a'$ from the side of the carriage meets the side of the top of the catch $v$ $l$ $m$ and, pressing against the same slips it over the pin $y$ and thus throws the pawl S out of gear with the ratchet wheel. By applying the hand to the carriage it may be drawn back and on placing another block therein—and throwing the pawls into gear with the ratchet carriage—the carriage is moved forward at regular intervals of time as before.

I claim—

1. The arrangement of the holders of the cutters for forming the bevel and groove and for cutting off the ends of the staves on curved or straight bars C C or similar contrivances, so that they may be adjusted to cut staves of different lengths, and preserve the bilge of the stave as herein described.

2. I also claim the combination of machinery by which the pawl S may be thrown out of gear with the ratchet wheel, said combination consisting of the upright bar $p\ q\ r$ lever $s\ t\ u$ spring $w$ catch $v\ l\ m$ and bar $l\ p$ the whole being arranged and operating substantially as herein above set forth.

In testimony that the above is a true description of my said invention and improvements I have hereto set my signature this twenty seventh day of October in the year eighteen hundred and forty.

CEPHAS MANNING.

Witnesses:
R. H. EDDY,
EZRA LINCOLN, Jr.